United States Patent
Kim et al.

(10) Patent No.: US 9,854,553 B2
(45) Date of Patent: Dec. 26, 2017

(54) METHOD AND SYSTEM FOR LINK SYNCHRONIZATION IN AN LTE-TDD ARCHITECTURE

(71) Applicant: Dali Systems Co. Ltd., George Town, Grand Cayman (KY)

(72) Inventors: Wan-Jong Kim, Port Moody (CA); Shawn Patrick Stapleton, Burnaby (CA)

(73) Assignee: Dali Systems Co. Ltd., George Town (KY)

(*) Notice: Subject to any disclaimer, the term of this patent is extended or adjusted under 35 U.S.C. 154(b) by 0 days.

(21) Appl. No.: 15/090,402

(22) Filed: Apr. 4, 2016

(65) Prior Publication Data

US 2016/0360500 A1    Dec. 8, 2016

Related U.S. Application Data

(60) Provisional application No. 62/142,689, filed on Apr. 3, 2015.

(51) Int. Cl.
*H04L 27/08* (2006.01)
*H04W 56/00* (2009.01)
*H04L 25/03* (2006.01)
*H04B 17/318* (2015.01)
*H04B 7/04* (2017.01)
*H04L 5/14* (2006.01)

(52) U.S. Cl.
CPC ......... *H04W 56/0095* (2013.01); *H04B 7/04* (2013.01); *H04B 17/318* (2015.01); *H04L 5/14* (2013.01); *H04L 25/03* (2013.01); *H04W 56/00* (2013.01)

(58) Field of Classification Search
CPC ......... H04B 17/318; H04L 25/03; H04L 5/14; H04W 56/00; H04W 56/0095
USPC ....................................................... 375/345
See application file for complete search history.

(56) References Cited

U.S. PATENT DOCUMENTS

| 5,122,735 A | 6/1992 | Porter et al. |
| 2003/0086515 A1 | 5/2003 | Trans et al. |
| 2008/0106456 A1 | 5/2008 | Ootomo et al. |

(Continued)

FOREIGN PATENT DOCUMENTS

WO    2014014396    1/2014

OTHER PUBLICATIONS

PCT/US2016/025900, "International Search Report and Written Opinion", dated Jul. 7, 2016, 11 pages.

*Primary Examiner* — Leila Malek
(74) *Attorney, Agent, or Firm* — Kilpatrick Townsend & Stockton LLP

(57) ABSTRACT

A method of detecting a synchronization switching pulse using a power detector in a time division duplexing (TDD) system includes receiving an input signal, detecting a power level associated with the input signal using a digital power meter, and determining a configuration associated with the input signal. The method also includes determining that a pulse width associated with the input signal is greater than a threshold, determining an offset associated with a special subframe configuration, and generating an estimated sync pulse. The method further includes forming a regenerated sync pulse, determining an error between the estimated sync pulse and the regenerated sync pulse, determining that the error is less than a threshold, and providing a lock detect.

18 Claims, 6 Drawing Sheets

(56) References Cited

U.S. PATENT DOCUMENTS

| | | | |
|---|---|---|---|
| 2009/0059070 A1* | 3/2009 | Matsui | H04N 5/10 348/500 |
| 2011/0081872 A1 | 4/2011 | Bar-Sade et al. | |
| 2012/0092184 A1 | 4/2012 | Carr et al. | |
| 2012/0120944 A1 | 5/2012 | Yang et al. | |
| 2013/0106617 A1* | 5/2013 | Heo | H04Q 9/00 340/870.07 |
| 2015/0085834 A1 | 3/2015 | Liu et al. | |

\* cited by examiner

METHOD AND SYSTEM FOR LINK SYNCHRONIZATION IN AN LTE-TDD ARCHITECTURE

CROSS-REFERENCES TO RELATED APPLICATIONS

This application claims priority to U.S. Provisional Patent Application No. 62/142,689 filed Apr. 3, 2015, entitled "Method And System For Link Synchronization In An LTE-TDD Architecture", the disclosure of which is hereby incorporated by reference in its entirety for all purposes.

BACKGROUND OF THE INVENTION

Long Term Evolution (referred to as 'LTE' hereinafter) systems have been referred to as LTE systems because they evolutionized the $3^{rd}$ generation (referred to as '3G' hereinafter) mobile communication system in a long term perspective. Using such systems, great progress has been made in providing mobile services.

Despite the availability of mobile services, there is a need in the art for accurate time division duplexing link synchronization methods for wireless communication systems, including RF repeaters and distributed antenna systems for time division duplexing.

SUMMARY OF THE INVENTION

The present invention generally relates to downlink/uplink synchronization method for Time Division Duplexing (TDD) Distributed Antenna Systems (DAS). More specially, the present invention relates to a novel downlink/uplink synchronization method using RF signal power in distributed antenna systems adopting Long Term Evolution—Time Division Duplexing. Embodiments of the present invention are applicable to LTE TDD Synchronization Detection Systems and Algorithms for Distributed Antenna Systems and functional aspects thereof are described herein.

Embodiments of the present invention relate to a synchronization switching pulse, also referred to as a sync switching pulse, detection method for time division duplexing (TDD) systems. As an example, embodiments of the present invention provide a method of automatically detecting the sync switching pulse without the use of various hardware additions. As described herein, a particular embodiment of the present invention is based on using a digital power meter, a sync debug module, an error detector, a 10 ms automatic reset module, a sync pulse regenerator, and an offset controlled 10 ms automatic reset module. Using the methods and systems described herein, it is possible to extract a highly accurate TDD-LTE frame structure defined sync switching pulse using only RF reception power.

Embodiments of the present invention provide an accurate method of extracting a time division duplexing synchronization pulse that switches uplink and downlink accordingly for LTE-TDD wireless communication systems. As described herein, technique based on RF digital power detection are used with analysis identifying rising/falling edges of the estimated synchronization pulse and calculating those pulse widths. Embodiments of the present invention are able to extract a highly accurate time division duplexing synchronization pulse without a complicated demodulator or a correlator.

According to an embodiment of the present invention, a method of detecting a synchronization switching pulse using a power detector in a time division duplexing (TDD) system is provided. The method includes receiving an input signal, detecting a power level associated with the input signal using a digital power meter, and determining a configuration associated with the input signal. The method also includes determining that a pulse width associated with the input signal is greater than a threshold, determining an offset associated with a special subframe configuration, and generating an estimated sync pulse. The method further includes forming a regenerated sync pulse, determining an error between the estimated sync pulse and the regenerated sync pulse, determining that the error is less than a threshold, and providing a lock detect.

According to another embodiment of the present invention, a system for generating synchronized signals is provided. The system includes a digital power meter, a sync debug module, and an error detector. The system also includes a first reset module, a sync pulse regenerator, and an offset controlled reset module.

According to a specific embodiment of the present invention, a method of generating a synchronization switching pulse in a time division duplexing (TDD) system is provided. The method includes receiving an input signal at an input port, receiving, at a digital power meter, a power threshold level, measuring, using the digital power meter, a power level associated with the input signal, and determining that the power level associated with the input signal exceeds the power threshold level. The method also includes determining, for the input signal, a number of rising edges, a number of falling edges, locations of the rising edges, and locations of the falling edges, determining, for the input signal, one or more pulse widths between the locations of the rising edges and the falling edges, and determining a downlink/uplink configuration associated with the input signal. The method further includes determining that a pulse width associated with the input signal is greater than a threshold, forming an estimated sync pulse, and determining a special subframe configuration associated with the input signal. Additionally, the method includes determining an offset associated with the special subframe configuration, forming a regenerated sync pulse, and determining, using an error detector, an error between the estimated sync pulse and the regenerated sync pulse. The method also includes determining that the error is less than an error threshold and providing the regenerated sync pulse as the synchronization switching pulse.

According to another specific embodiment of the present invention, a method of detecting a synchronization switching pulse in a time division duplexing (TDD) system is provided. The method includes receiving an input signal, detecting a power level associated with the input signal using a digital power meter, and determining a configuration associated with the input signal. The method also includes determining that a pulse width associated with the input signal is greater than a threshold and determining an offset associated with a special subframe configuration. The method further includes generating an estimated sync pulse, forming a regenerated sync pulse, and determining an error between the estimated sync pulse and the regenerated sync pulse. The method additionally includes determining that the error is less than a threshold and providing a lock detect.

Numerous benefits are achieved by way of the present invention over conventional techniques. For example, embodiments of the present invention provide methods and systems for providing highly accurate synchronization in LTE-TDD systems. These and other embodiments of the

DETAILED DESCRIPTION OF SPECIFIC EMBODIMENTS

Wireless multiple access and multiplexing methods are based on orthogonal frequency-division multiplexing (referred to as 'OFDM' hereinafter), and the high speed packet data transmission method is based on multiple-input and multiple-output (MIMO). LTE Advanced systems are an evolutionized version of the above-described LTE. There are two types of duplexing method, that is, a frequency division duplexing, which separates uplink and downlink by frequency band and time division duplexing (referred to as 'TDD' hereinafter), which separates uplink and downlink by time domain.

Wireless communication systems which use time division duplexing method should perform link route switching at an exact time point.

In general, frames are synchronized in an OFDM system by using a correlation method in a cyclic prefix duration or in a preamble duration, or a pilot detecting method. However, in correlation based methods, correlation values may fluctuate due to the characteristic of a wireless channel, which means those methods need additional signal processing power to keep the correlation values stable. The pilot detecting method requires a demodulator, which can result in complexity and cost in a wireless communication systems.

Figure 1:
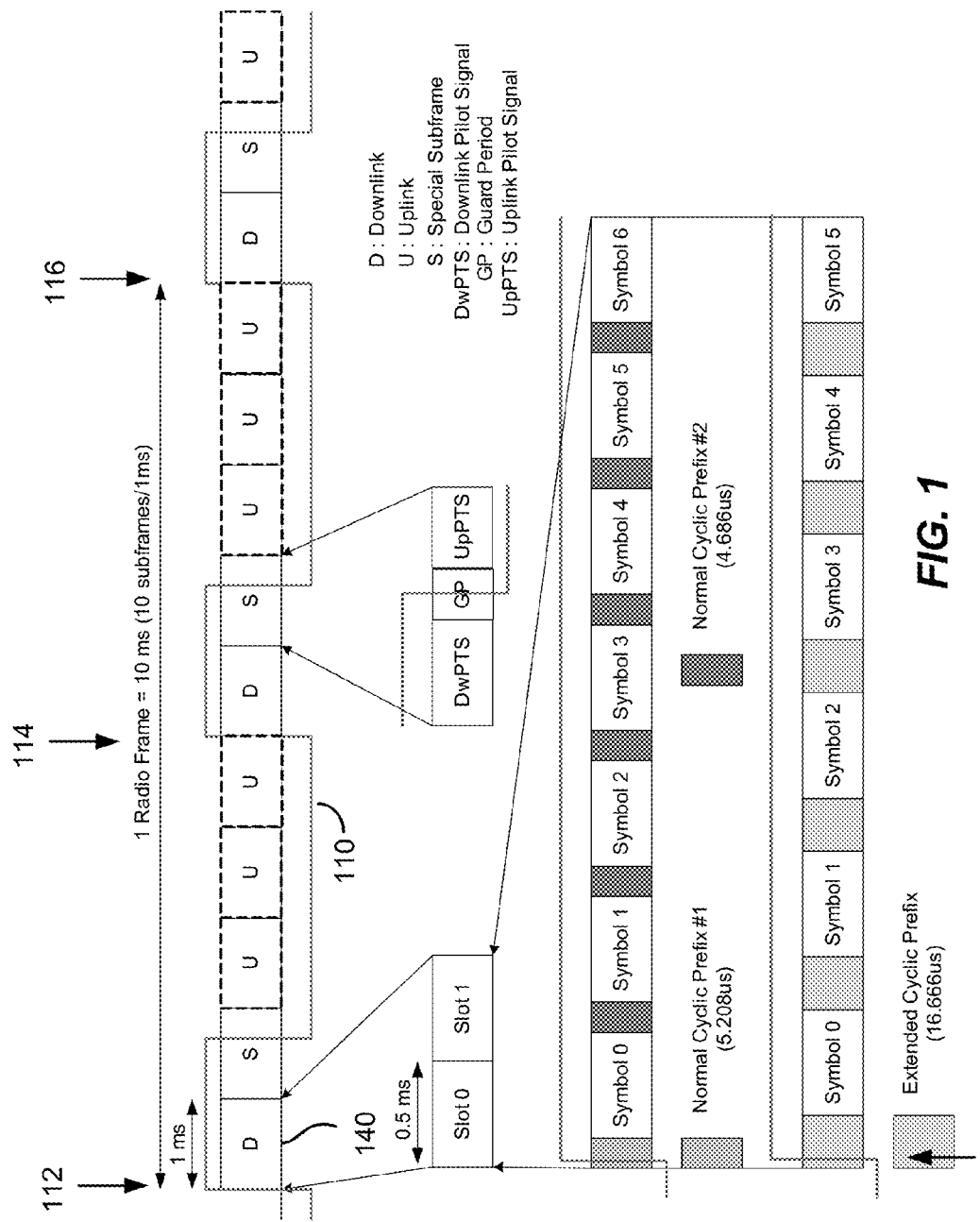
FIG. 1 is a frame structure of a first downlink/uplink configuration for the LTE-TDD standard according to an embodiment of the present invention.

FIG. 1 is a frame structure of a first downlink/uplink configuration (i.e., configuration 0) for the LTE-TDD standard according to an embodiment of the present invention. As illustrated in FIG. 1, one radio frame is characterized by a 10 ms duration and includes ten subframes, with each subframe having a 1 ms duration and two slots. The subframes include downlink and uplink subframes that are separated in time as appropriate for a time division architecture. There is a special subframe consisting of a downlink pilot signal, a guard period, and an uplink pilot signal. Referring to FIG. 1, the downlink pilot signal (DwPTS) and the uplink pilot signal (UpPTS) are separated by the guard period (GP). This special subframe has nine different configurations with a normal cyclic prefix and seven different configurations with an extended cyclic prefix.

In order to separate received signals, synchronization is used to separate the downlink signals and place them in the downlink path and the uplink signals and place them in the uplink path. As an example, downlink signals from a base station can be received as RF signals at a base station input port and synchronization is used to switch downlink and uplink signals into the appropriate path. As illustrated in FIG. 1, the total length of the special subframe is 1 ms. Depending on the particular downlink/uplink configurations and special subframe configurations, embodiments of the present invention change the switching point changes as described herein. In order to detect the synchronization pulse with high accuracy, the downlink/uplink configuration and the special subframe configuration are identified and utilized by embodiments of the present invention.

Depending on the special subframe configuration, the first switching point is changed by embodiments of the present invention. Accordingly, the synchronization detection apparatus, which may be an automatic sync detection apparatus, provided by embodiments of the present invention identifies the special subframe configuration and then generates a highly accurate sync switching pulse.

Referring to FIG. 1, line 110 illustrates a desirable sync switching pulse shape (e.g., a TDD switching pulse). In the illustrated sync switching pulse 110, there are three switching points, 112, 114, and 116 at which the sync switching pulse transitions from low to high. In each slot, there are seven OFDM symbols for a normal cyclic prefix and six OFDM symbols for an extended cyclic prefix as shown in FIG. 1. Since there is no special subframe involved in the second switching point 114, the second switching must be accomplished within the cyclic prefix (5.208 µs for normal cyclic prefix or 16.666 µs for extended cyclic prefix) providing that path delay is zero. The switching enables the data in the downlink and uplink paths to be separated as discussed above, with the downlink path being active when the switching signal is high and the uplink path being active when the switching signal is low.

The special subframe, which follows a downlink subframe, starts with a downlink pilot signal, enabling the switching to be performed during the guard period.

Table 1 illustrates the seven downlink(DL)/uplink(UL) configurations 0-6 for the LTE-TDD standard. In Table 1, the DL-UL configurations are shown including D:Downlink, U:Uplink, and S:Special subframe.

TABLE 1

| DL-UL Config- uration | DL-UL Switch- Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| DL-UL Configuration | DL-UL Switch-Point Periodicity | Subframe Number | | | | | | | | | |
|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As illustrated in Table 1, configuration 0 includes a single downlink subframe followed by a special subframe, three uplink subframes, a downlink subframe, a special subframe, and three uplink subframes. The other configurations include different combinations of downlink subsframes and uplink subframes.

Referring once again to FIG. 1, the downlink subframe 140 includes two slots Slot 0 and Slot 1. The two slots include a prefix (either a set of normal cyclic prefixes (normal cyclic prefix #1 and normal cyclic prefix #2) or an extended cyclic prefix) and seven symbols for the normal cyclic prefix case or six symbols for the extended cyclic prefix case. As illustrated at time 150, switching needs to be performed within the prefix period in order to have the switching signal high in advance of the first symbol.

Figure 2A:
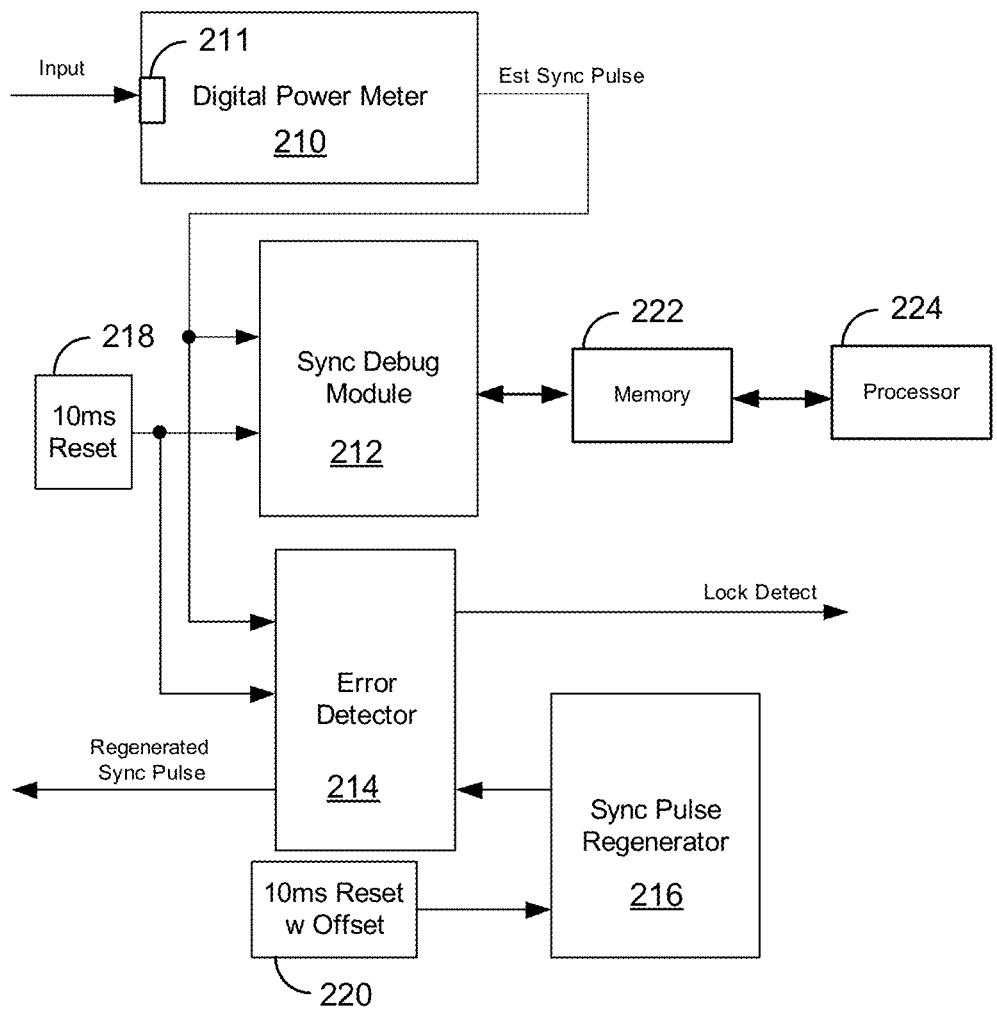
FIG. 2A is a simplified block diagram of an automatic sync detection apparatus based on reception signal power according to an embodiment of the present invention.

FIG. 2A illustrates a block diagram of a sync detection apparatus (e.g., an automatic apparatus) based on reception signal power in accordance with an embodiment of the present invention. In the embodiment illustrated in FIG. 2A, the apparatus includes a digital power meter 210 that receives an input, a sync debug module 212, an error detector 214, a 10 ms automatic reset module 218, a sync pulse regenerator 216, and an offset controlled 10 ms automatic reset module 220. The digital power meter 210 detects the signal power (e.g., the downlink signal power of the signal that is received from the base station) associated with the input signal. In an embodiment, the input port 211 can be a base station input port. In addition to the input signal (DIN I), which can be a digital input signal, the TDD/FDD power meter receives a TDD threshold value (TDD th), also referred to as a power threshold level, that is used to measure the presence of the input signals as described herein. Thus, the digital power meter 210 provides a thresholding function such that if the received power is greater than the predefined threshold (TDD th), then an estimated sync switching pulse is generated as described herein.

In other words, the estimated sync switching pulse, also referred to as an estimated sync pulse, is generated by comparing very short term average powers with a predefined threshold. Additional description related to the estimated sync pulse is provided in relation to FIGS. 4A and 5A. After initial generation of the estimated sync pulse, the accuracy with which the sync pulse matches the start of the downlink signal is not necessarily optimized.

The sync debug module 212 estimates the number of rising and falling edges (No RSp and No FSp in FIG. 2B) and those locations (Loc Data) using edge detectors and counters in an embodiment. Those parameters are stored in the memory 222, which can be read by the processor 224. The 10 ms reset module 218 resets the sync debug module 212 every 10 ms, which corresponds to the length of the radio frame. In operation, the sync debug module 212 receives the estimated sync pulse from the digital power meter 210 and counts the width of the estimated sync pulse. In some embodiments, the estimated sync pulse is in the format of a series of sub-pulses and the sync debug module samples the signal and counts the number of sub-pulses making up a larger pulse. In an embodiment, the sample time can be on the order of 0.1 μs, although other sampling times can be utilized. When the input power drops below the predetermined threshold, the estimated sync pulse returns to a baseline, for example, zero, enabling measurement of the width of the estimated sync pulse.

The width of the estimated sync pulse is determined and the error detector 214 is used to determine the error between the estimated sync pulse and the expected time of the subframe. Referring to Table 2, for special subframe configuration 0, the DwPTS is ~214 μs. For DL-UL configuration 0, the length of the first pulse beginning with the rising edge of D in subframe 0 and extending into the guard period of special subframe S in subframe 1, should be in the range of 1.214 ms to 1.928 ms. As an example, if the width of the estimated sync pulse is 0.995 ms and the desired pulse width were 1.0 ms, then the error is 0.005 ms=5 μs, which is less than the cyclic prefixes. In this case, the synchronization is within the desired accuracy and lock detect can be enabled. If on the other hand, the width of the estimated sync pulse is 0.9 ms, then the error is 0.1 ms=100 μs, which would result in the switching pulse being outside the window defined by the cyclic prefix. In this case, the error detector 214 will provide an output to the sync pulse regenerator 216 so that the 10 ms reset pulse is delivered with an offset accounting for the error measured by the error detector.

Based on those parameters and frame structure definition, a sync switching pulse is regenerated in the Sync Pulse Regenerator 216, and then an error is calculated by subtracting the estimated sync switching pulse with the regenerated sync switching pulse. Provided that the estimated sync switching pulse is accurate and real time, when the error is below the predefined value, lock detect is achieved and output by the error detector 214.

Figure 2B:
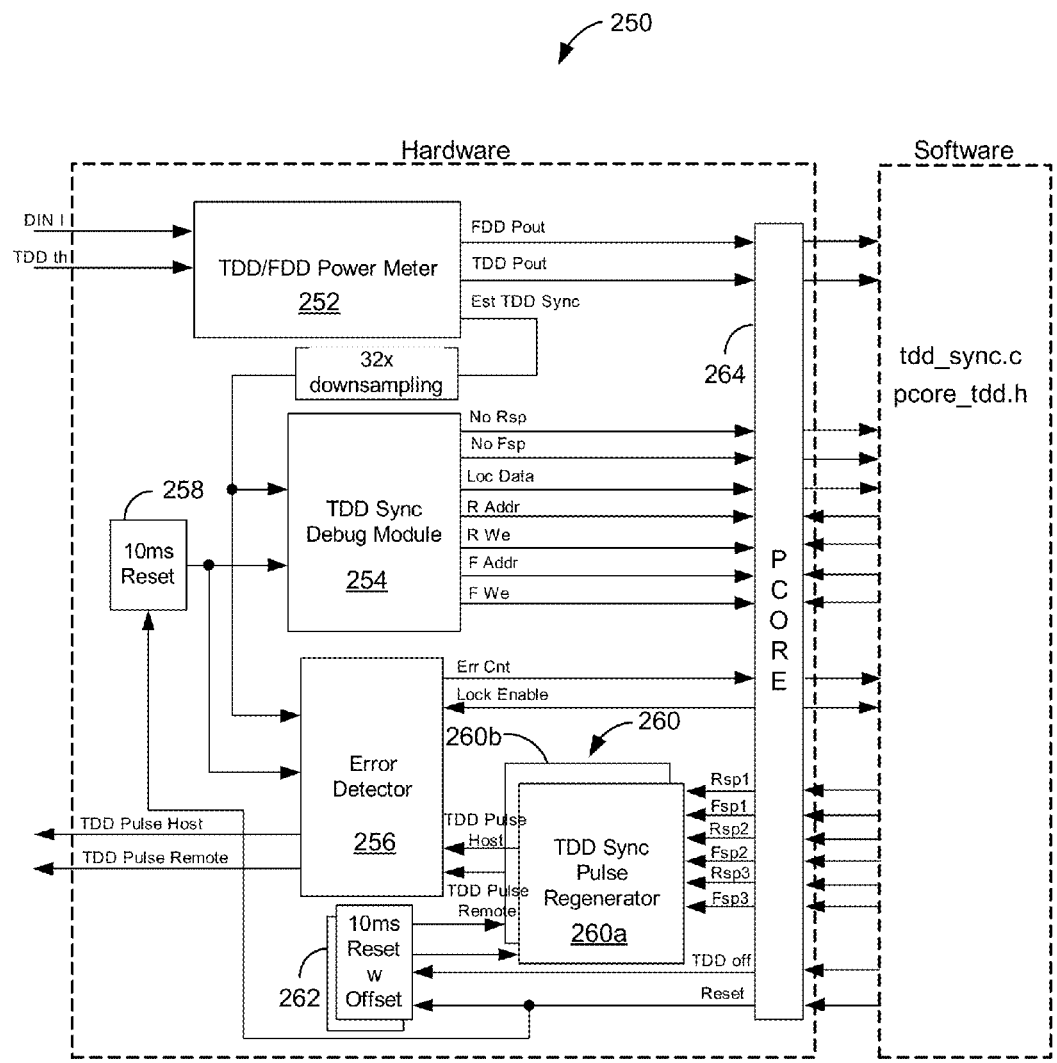
FIG. 2B is a simplified block diagram of an automatic sync detection apparatus based on reception signal power including additional elements according to an embodiment of the present invention.

FIG. 2B illustrates a block diagram of a sync detection apparatus (e.g., an automatic sync detection apparatus) according to another embodiment of the present invention. The embodiment illustrated in FIG. 2B provides additional details of the interface implementations in relation to FIG. 2A. As illustrated in FIG. 2B, the microcontroller unit through the interface (PCORE 264) can be used to perform calculations associated with the various modules, including the TDD sync debug module 254, the TDD error detector 256, the TDD sync pulse regenerator 260, and the like, which can be referred to without the TDD reference.

Referring to FIG. 2B, the TDD sync detection module 250 can be, for example, a component of a digital access unit, also referred to as a host unit. In DAS implementations, the host unit communicates with one or more remote units. The TDD sync detection module 250 includes TDD/FDD Power Meter 252, TDD Sync Debug Module 254, TDD Sync Pulse Regenerator 260, Error Detector 256, and PCORE 264. TDD/FDD Power Meter 252 includes a short term average power meter and an accumulator that is used to calculate the long term average power for the FDD mode as well as the TDD mode. Power output levels for TDD and FDD signals are provided by the TDD/FDD Power Meter and can be output to the PCORE. The estimated TDD Sync can be generated by comparing the short term average power with a TDD threshold and output from the TDD/FDD power meter. In some implementations, the estimated TDD Sync signal is downsampled (e.g., by a factor of 32) before being passed to the TDD Sync Debug Module 254 and the Error Detector 256 as an input.

The TDD Sync Debug Module 254 estimates the numbers of rising switching point (Number of Rsp or No Rsp) and falling switching point (Number of Fsp or No Fsp) and the locations of those rising and falling switching points (Loc Data). These values are stored in shared memory inside of PCORE 264, so that a processor can use them in a TDD sync detection software algorithm.

The TDD Sync Pulse Regenerator 260 generates the final TDD sync pulse after the algorithm makes a decision on rising and falling switching points. Information on the rising edges and the falling edges, including location, is provided to the TDD Sync Pulse Regenerator 260 from the processor/memory represented by PCORE. As illustrated in the embodiment shown in FIG. 2B, there are two TDD Sync Pulse Regenerators. A first of the TDD Sync Pulse Regenerators 260a is used for a host including TDD sync detection, ADC, and RF DNC delay offset. The second of the TDD Sync Pulse Regenerators 260b is used for a remote including TDD sync detection module delay offset. As illustrated in FIG. 2B, the TDD synchronization pulse for the host (TDD Pulse Host) and the TDD synchronization pulse for the a remote (TDD Pulse Remote) are output by the set of TDD Sync Pulse Regenerators, respectively. In some embodiments, multiple remotes can be provided with synchronization pulses that vary depending on the time delay/distance between the hardware illustrated in FIG. 2B and the applicable remote by replicating the host/remote pulse regenerator model. In an alternative implementation, elements of the hardware and software illustrated in FIG. 2B could be implemented in a remote unit by measuring the input signal that is received at the remote. One of ordinary skill in the art would recognize many variations, modifications, and alternatives.

Error Detector 256 evaluates the accuracy of the final TDD sync pulse using an error counter value. For example, if the error counter value is below an error threshold, the methods described herein enable Lock, which means that the accuracy of the final TDD Sync is within a predetermined and acceptable range. The function provided by the error detector can be considered as analogous to that of a phase locked loop, as the error between the estimated sync pulse and the regenerated sync pulse is measured and the offset is adjusted to reduce the error.

Figure 3:
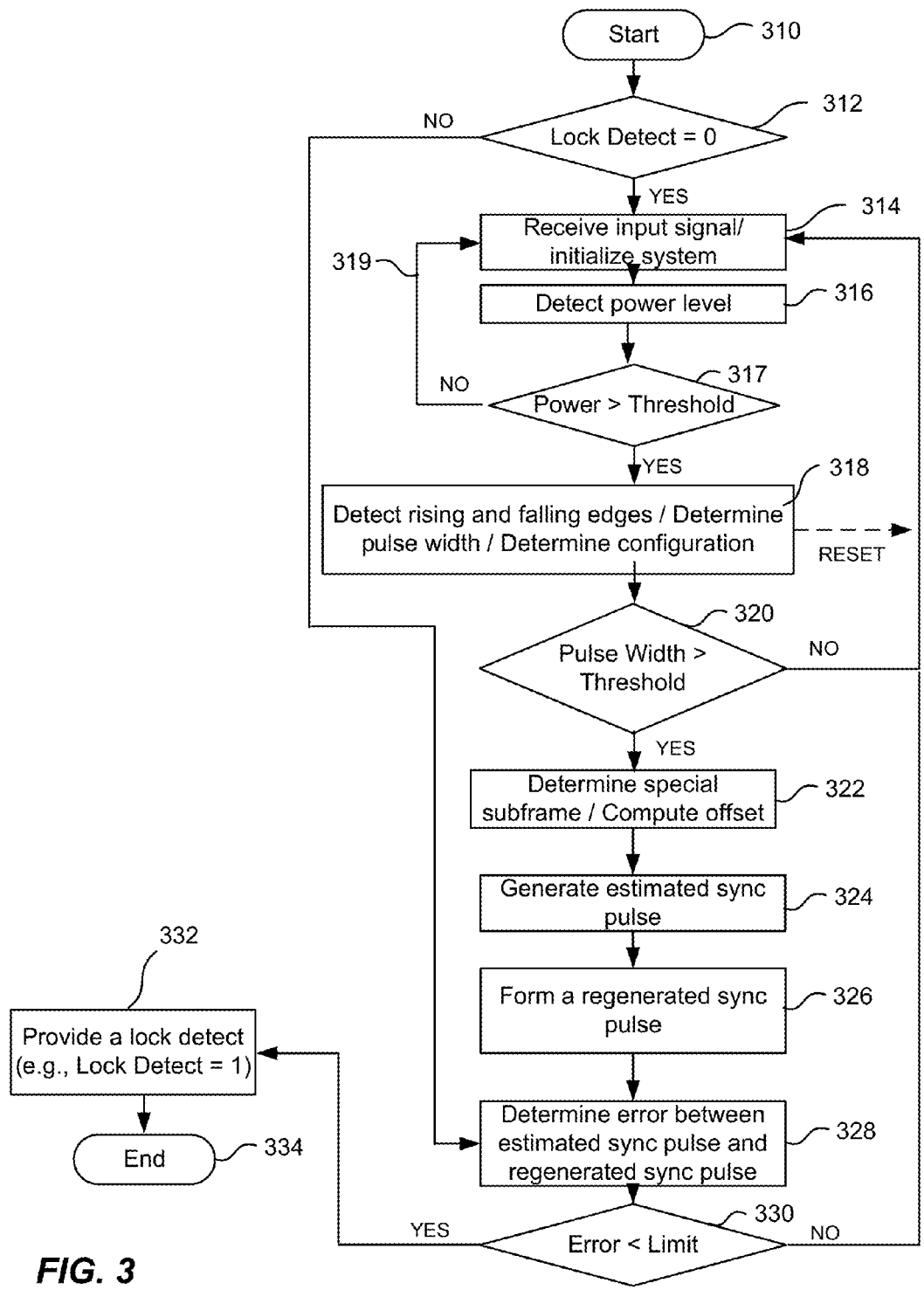
FIG. 3 is a simplified flow chart illustrating a method of synchronization according to an embodiment of the present invention.

FIG. 3 illustrates a flowchart describing a method of synchronization in accordance with an embodiment of the present invention. The synchronization method illustrated herein can be implemented using a processor, included, for example, in PCORE 264. At start (310), lock detect is checked to decide if full processing is required (312). At system boot-up, the default value of the lock detect is zero, compared to a value of unity for lock being present. For the full process, the input signal is received and the sync detection module is initialized (314), for example, with a synchronous reset from 10 ms Reset module 254. In some embodiments, the input signal is present because it is received from the BTS, which can be associated with threshold information (TDD th) for the TDD system. The received power level is measured (316) and then provided to modules such as those illustrated in FIG. 2A and FIG. 2B to determine if the input power level is above a threshold.

The TDD/FDD Power Meter 252 is utilized to compute the long term FDD and TDD average power and the estimated TDD sync pulse by using the short term TDD power and the TDD threshold. If the power level exceeds a threshold (317), for example, drawn from the TDD threshold information, then the synchronization process proceeds. If the power level is less than the threshold (317), then an iterative process (319) can be used to continue checking the power level in order to determine when it exceeds the threshold. As an example, if the BTS is off, no synchronization is performed and the system will check the power level before starting the synchronization process. In this iterative case, the system may or may not be initialized as the input signal is received and the power level measured and compared to the threshold.

Figure 4A:
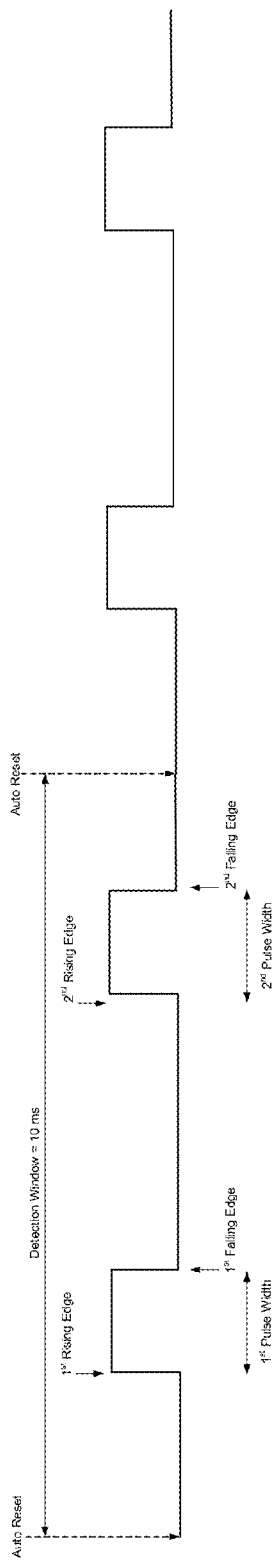
FIG. 4A is a timing diagram illustrating an example of a synchronization pulse detection method for an estimated sync pulse according to an embodiment of the present invention.

The rising edges and falling edges of the input signal are detected to determine the number of rising edges, the number of falling edges, and the locations of these rising and falling edges using the estimated TDD sync pulse. Using the rising edges and falling edges, the pulse width is determined (318) based on the time between corresponding rising and falling edges. Referring to FIG. 4A, the first rising edge and the first falling edge can be used to determine the first pulse width. Depending on the configuration, a single pulse width can be utilized to determine the configuration, whereas, in other configurations, multiple pulse widths can be utilized in some implementations.

In some implementations, subsequent rising edges and falling edges can be used to determine widths of subsequent pulses. As an example, the number of rising edges and falling edges and their locations can be used to narrow down the number of possible configurations discussed in relation to Table 1. Subsequently, as described below, the measured pulse width or pulse widths can be used to narrow down the configuration further, preferably arriving at a single configuration. Referring to FIG. 4A, the first pulse and the second pulse have equal lengths, which is appropriate for DL-UL configuration 0. Thus, the configuration is determined (318).

Accordingly, the parameters stored in the memory for each of the possible configurations are utilized in order to compare the number of rising and falling edges with those stored in memory. The pulse widths are also used in determining the configuration. Since different configurations have different numbers of rising and falling edges and potentially different pulse widths, downlink/uplink configurations are identified in this stage (318).

In summary, the rising edges and the falling edges are detected, for example using the TDD Sync Debug Module 254 and/or the Error Detector 256, the pulse width is determined, and this information is used to determine which DL-UL configuration is being utilized. Referring to Table 1, configuration 0 includes two rising edges (before subframe 0 and subframe 5) and two falling edges (during subframe 1 and subframe 6). This contrasts with configuration 2, which includes three rising edges and two falling edges. Thus, the rising and falling edges, along with the duration of the high/low pulses can be used to determine the DL-UL configuration.

The pulse width(s) can be determined using the TDD Sync Debug Module 254, which can count time slots in which the input power exceeds the threshold to measure the pulse width(s). In some embodiments, the Error Detector 256 and TDD Sync Debug Module 254 are combined into a single module. One of ordinary skill in the art would recognize many variations, modifications, and alternatives. If the configuration cannot be determined at process 318, then the system resets (314).

A determination is made of whether or not the pulse width is greater than a threshold for each of the configurations (320). If the pulse width is greater than a threshold, then the special subframe configuration as illustrated in Table 2 is determined (322), including the normal or extended cyclic prefix. Although the subframe illustrated in FIG. 1 for the first downlink frame has a pulse width of ~1.5 ms, other configurations have wider pulse widths, for example, the three consecutive downlink subframes in configuration 2. In some embodiments, the pulse widths of all pulses in the frame are determined in accordance with the configuration as part of process 318. If the pulse width is not greater than the threshold, which depends on the configuration, then the system is reinitialized using the 10 ms reset (314). This condition may be encountered when the configuration is modified, for example. In other situations, an error in the configuration determination would be identified by the pulse width(s) not exceeding the threshold(s), resulting in a system reset. In embodiments in which multiple pulse widths are determined, then there can be differing or the same thresholds applied to the multiple pulse widths. If the pulse width is greater than the threshold, considered for all configurations, then the downlink/uplink/special subframe configuration is determined and the offset is computed (322).

Table 2 illustrates special subframe configurations according to an embodiment of the present invention. As illustrated in Table 2, there are different switching points depending on the special subframe configuration. In process 322, the special subframe configuration is determined and the offset associated with each of the special subframes is then determined by comparing the rising/falling edge points of the signal with the corresponding points associated with the determined special subframe configuration. Since the guard period depends on the configuration, the offset is provided depending on the configuration and the special subframe configuration that has been determined. Referring to Table 2, the differing lengths of the DwPTS will result in differing offsets that can be measured depending on the switching point. As an example, referring to the pulse starting at 114 in FIG. 1, the location of the falling edge in time will depend on the length of the DwPTS and the GP associated with the particular special subframe. As a result, the width of the pulse starting at 114 provides information that is useful in determining the special subframe configuration.

pulse is based on the error detected by the sync debug module. The comparison of the estimated sync pulse and the regenerated sync pulse provides a count of the time periods in which the pulses are the same and the time periods in which the pulses are different. The sync pulse regenerator can shift the 10 ms reset pulse in time based on the measured error, reducing the error in an iterative manner. Once the error value (e.g., an error count) is less than a predefined threshold or limit (330), it can be determined that lock detect has been achieved (332). The error count will decrease as the estimated sync pulse becomes more closely aligned with the regenerated sync pulse. If the error count is greater than the limit (330), associated with significant misalignment of the estimated sync pulse and the regenerated sync pulse, then the system is reset (314). In the next iteration, full processing is skipped unless the error count is over the predefined threshold.

It should be appreciated that the specific steps illustrated in FIG. 3 provide a particular method of synchronization according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4B:
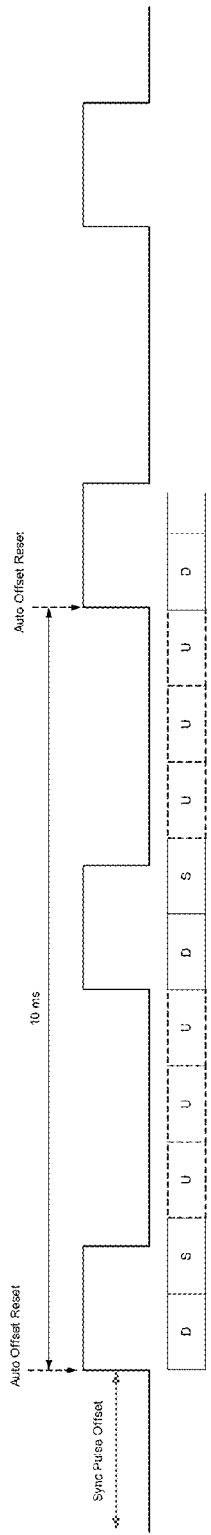
FIG. 4B is a timing diagram illustrating an example of a synchronization pulse detection method for a regenerated sync pulse according to an embodiment of the present invention al in the present invention.

FIGS. 4A-4B illustrate one example of the estimated sync switching pulse and the regenerated sync switching pulse in the case where the rising edge is detected first. FIG. 4A illustrates the estimated sync pulse and FIG. 4B illustrates the regenerated sync pulse for DL-UL configuration 0. This is a normal scenario because normally, the input signal is applied after the system boot-up is performed. Although the

TABLE 2

| Special Subframe Configuration | Normal Cyclic Prefix | | | Extended Cyclic Prefix | | |
|---|---|---|---|---|---|---|
| | DwPTS(us) | GP(us) | UpPTS(us) | DwPTS(us) | GP(us) | UpPTS(us) |
| 0 | 214.58 | 714.07 | 71.35 | 250.00 | 666.66 | 83.34 |
| 1 | 643.23 | 285.42 | | 666.67 | 250 | |
| 2 | 714.58 | 214.07 | | 750.00 | 166.66 | |
| 3 | 785.94 | 142.71 | | 833.33 | 83.33 | |
| 4 | 857.29 | 71.36 | | 250.00 | 583.33 | 166.67 |
| 5 | 214.58 | 642.71 | 142.71 | 666.67 | 166.66 | |
| 6 | 643.23 | 214.06 | | 750.00 | 83.33 | |
| 7 | 714.58 | 142.71 | | — | — | — |
| 8 | 785.94 | 71.35 | | — | — | — |

The estimated sync pulse is generated (324) and given the configuration, the special subframe configuration, and the offset, the TDD Sync Pulse Regenerator 260 is used to regenerate the sync pulse appropriate for the configuration number (326), including the offset, which may be associated with the special subframe (e.g., the DwPTS or the GP).

In summary, once downlink/uplink configurations have been identified (318), special subframe configuration, and cyclic prefix have been accurately identified, and the offset has been determined, a sync pulse can be regenerated using the predefined switching point values based on the frame structure. As a final stage of the method, error calculation is performed between the estimated sync pulse and the regenerated sync pulse (328). The estimated sync pulse is based on the received signal in real time. The regenerated sync estimated sync pulse illustrated in FIG. 4A is very clean, this is not required by the present invention and typically, the estimated sync pulse is noisy due to signal variations. The regenerated sync pulse, therefore, provides a clean version of the estimated sync pulse that is then useful for distribution to equipment for purposes of synchronization. In particular, the leading edge of the regenerated sync pulse is clean. Drift between the regenerated sync pulse and the estimated sync pulse is systematically corrected using the embodiments described herein.

The sync debug module detection window is 10 ms and the module is reset every 10 ms as shown in FIG. 4A. The module detects two rising edges with locations and two falling edges with locations, so that the pulse widths can be calculated. In FIG. 4A, the auto reset is performed near the end of the frame, enabling a detection of rising edge/falling edge following by the detection of the second rising/falling edges. In some implementations, the first pulse having the first pulse width is referred to as the sync pulse or synchronization pulse. Depending on the configuration, the pulses can have differing widths.

In FIG. 4B, using the first rising edge location, the sync switching pulse can be regenerated with the proper offset. As illustrated in FIG. 4B, the DL-UL configuration 0 subframes are illustrated below the regenerated sync pulse pattern: D-S-U-U-U-D-S-U-U-U:D . . . . In other words, given the measured pulse pattern and the configuration, the offset is determined and the regenerated sync pulse is formed such that the regenerated sync pulse is offset to match the estimated sync pulse, i.e., the rising edges of the estimated and regenerated sync pulses are aligned. Since the estimated sync switching pulse only detects downlink signal power, the sync switching pulse (i.e., the regenerated sync pulse) is modified given the consideration of the guard period or the cyclic prefix as defined in the frame structure as discussed above. Therefore, a more accurate sync switching pulse can be created by using the sync switching pulse regenerator.

Figure 5A:
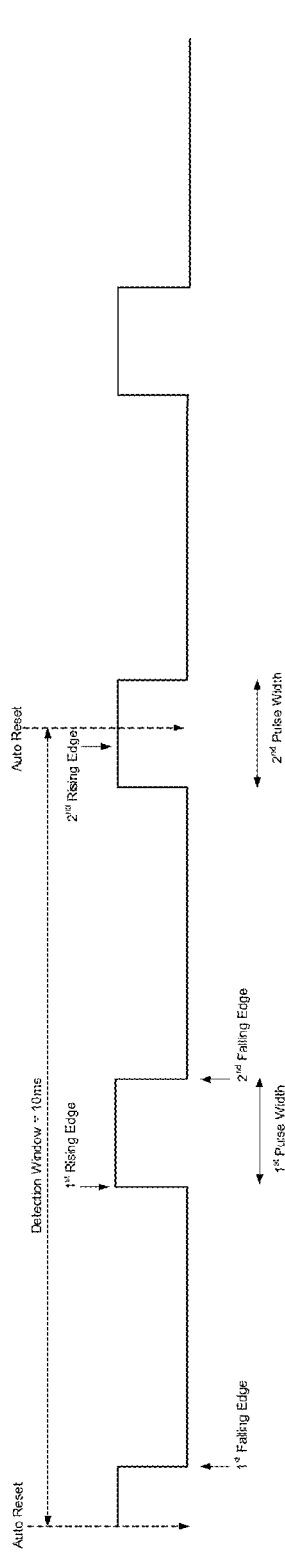
FIG. 5A is a timing diagram illustrating another example of a synchronization pulse detection method for an estimated sync pulse according to an embodiment of the present invention al in the present invention.
Figure 5B:
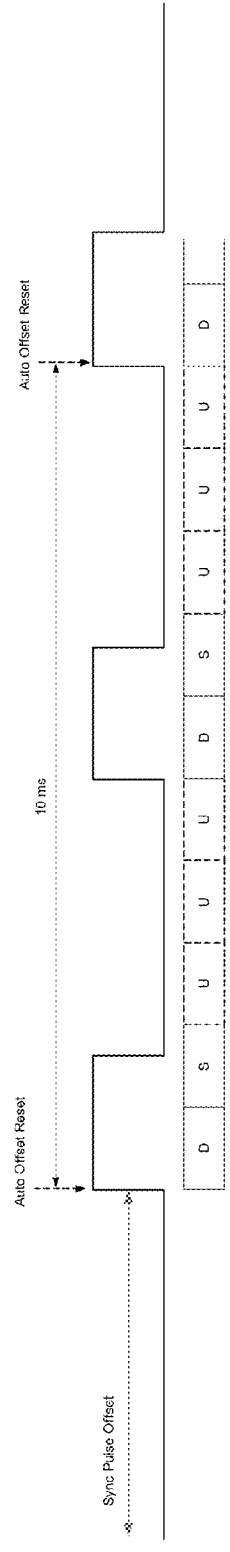
FIG. 5B is a timing diagram illustrating another example of a synchronization pulse detection method for a regenerated sync pulse according to an embodiment of the present invention al in the present invention.

FIGS. 5A-5B illustrate another example of the estimated sync switching pulse (FIG. 5A) and the regenerated sync switching pulse (FIG. 5B) in the case where the falling edge is detected first. This is a scenario that is typically encountered when the system boots up with a pre-engaged input signal such that the measurement by the power detector begins in the middle of the D/S subframes. The module detects two rising edges with locations and two falling edges with locations as in FIG. 5A, but in this case, the first falling edge is detected first, which means that the manner in which the pulse widths are calculated is modified.

In FIG. 5B, using the first rising edge location, the sync switching pulse can be regenerated with the proper offset. Since the estimated sync switching pulse only detects downlink signal power, the sync switching pulse is modified given the consideration of the guard period or the cyclic prefix as defined in the frame structure as discussed above. Therefore, a more accurate sync switching pulse can be created by using the sync switching pulse regenerator.

In some embodiments, the widths of the pulses in the frame are measured and used to provide an offset the matches the first subframe of the regenerated sync pulse to the first subframe of the estimated sync pulse. As an example, for DL-UL configuration 4, if the auto reset were performed at subframe 5, the falling edge in subframe 2 would be measured first followed by the rising edge of subframe 4. Given this single pulse, the falling edge and rising edge would be used to determine the pulse width and the rising edge could then be used to determine the offset for this configuration.

In some embodiments, a system operating at a higher level of the architecture, for example, a main controller, can monitor and control the LTE TDD sync detection algorithm. This system such as a main controller can monitor the downlink/uplink configuration, the special subframe, the normal or extended cyclic prefix, and other parameters. As illustrated in FIG. 2B, the system outputs two switching pulses, TDD Pulse Host and TDD Pulse Remote, which are for the host and for the remote, respectively. These host and remote pulses have different delay offsets that are calibrated in the system.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of generating a synchronization switching pulse in a time division duplexing (TDD) system, the method comprising:
receiving an input signal at an input port of a digital power meter;
receiving, at the digital power meter, a power threshold level;
measuring, using the digital power meter, a power level associated with the input signal;
determining that the power level associated with the input signal exceeds the power threshold level;
determining, for the input signal, a number of rising edges, a number of falling edges, locations of the rising edges, and locations of the falling edges;
determining, for the input signal, one or more pulse widths measured between the locations of the rising edges and the falling edges;
determining a downlink/uplink configuration associated with the input signal;
determining that at least one of the one or more pulse widths is greater than a threshold;
forming an estimated sync pulse;
determining a special subframe configuration associated with the input signal;
determining an offset;
forming a regenerated sync pulse;
determining, using an error detector, an error between the estimated sync pulse and the regenerated sync pulse;
determining that the error is less than an error threshold; and
providing the regenerated sync pulse as the synchronization switching pulse.

2. The method of claim 1 wherein the input port is operable to receive an input from a base station.

3. The method of claim 1 wherein the downlink/uplink configuration complies with a Long Term Evolution (LTE)-TDD standard.

4. The method of claim 1 wherein forming the regenerated sync pulse comprises generating a TDD-Long Term Evolution (LTE) frame structure defined sync pulse with pre-defined time durations and the offset.

5. The method of claim 1 wherein the error detector is operable to compare the estimated sync pulse with the regenerated sync pulse and to provide an error signal for use in shifting the regenerated sync pulse in time.

6. The method of claim 1 wherein the offset is associated with the special subframe configuration.

7. A system for generating synchronized signals, the system including:
a digital power meter including a first input port and a second input port, the first input port being configured to detect an input signal and the second input port being configured to receive a power threshold level, wherein the digital power meter determines that a power level associated with the input signal exceeds the power threshold level and outputs an estimated sync pulse;
a sync debug module coupled to the digital power meter and configured to determine a width of the estimated sync pulse;
an error detector coupled to the digital power meter and configured to determine a calculated error between the estimated sync pulse and an expected time of a subframe;

a first reset module coupled to the sync debug module and configured to transmit a reset signal to the sync debug module at an interval corresponding to the expected time of the subframe;

a sync pulse regenerator coupled to the error detector and configured to output a regenerated sync pulse; and an offset controlled reset module coupled to the sync pulse regenerator.

8. The system of claim 7 wherein the sync debug module is operable to identify rising edges and falling edges of a set of pulses and to compute pulse widths for each pulse of the set of pulses.

9. The system of claim 7 wherein the sync pulse regenerator is operable to generate a Time Division Duplexing-Long Term Evolution (TDD-LTE) frame structure defined sync pulse with predefined time durations and a predetermined offset time.

10. The system of claim 7 wherein the error detector is operable to compare the estimated sync pulse with the regenerated sync pulse and to provide an error for use in offsetting the regenerated sync pulse.

11. The system of claim 7 wherein the input signal is received at a base station input port.

12. The system of claim 7 wherein the regenerated sync pulse comprises a Time Division Duplexing-Long Term Evolution (TDD-LTE) frame structure defined sync pulse with predefined time durations and a predetermined offset time.

13. The system of claim 7 wherein the error detector is operable to receive the estimated sync pulse and the regenerated sync pulse and to provide an error for use in offsetting the regenerated sync pulse.

14. A method of detecting a synchronization switching pulse in a time division duplexing (TDD) system, the method comprising:

receiving an input signal;

detecting a power level associated with the input signal using a digital power meter;

determining a configuration associated with the input signal;

determining that a pulse width associated with the input signal is greater than a threshold;

determining an offset associated with a special subframe configuration;

generating an estimated sync pulse;

forming a regenerated sync pulse;

determining an error between the estimated sync pulse and the regenerated sync pulse;

determining that the error is less than a threshold; providing the regenerated sync pulse as the synchronization switching pulse; and providing a lock detect.

15. The method of claim 14 wherein the input signal is received from a base station.

16. The method of claim 14 wherein the determining the configuration comprises detecting rising edges and falling edges of a set of pulses and determining pulse widths of each pulse in the set of pulses.

17. The method of claim 14 wherein forming the regenerated sync pulse comprises generating a TDD-Long Term Evolution (LTE) frame structure defined sync pulse with predefined time durations and a predetermined offset time.

18. The method of claim 14 wherein an error detector is operable to compare the estimated sync pulse with the regenerated sync pulse and to provide an error for use in offsetting the regenerated sync pulse.

* * * * *